United States Patent
Kubitza et al.

(10) Patent No.: US 11,014,488 B2
(45) Date of Patent: May 25, 2021

(54) PROCEDURE FOR ACTUATING AT LEAST ONE LIGHT MODULE OF A LIGHT UNIT, LIGHT UNIT, COMPUTER PROGRAM PRODUCT AND MACHINE-READABLE MEDIUM

(71) Applicant: Hella GmbH & Co. KGaA, Lippstadt (DE)

(72) Inventors: Boris Kubitza, Möhnesee-Körbecke (DE); Jacek Roslak, Paderborn (DE); Udo Venker, Güterlsoh (DE); Carsten Wilks, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 16/640,962

(22) PCT Filed: Aug. 7, 2018

(86) PCT No.: PCT/EP2018/071374
§ 371 (c)(1),
(2) Date: Feb. 21, 2020

(87) PCT Pub. No.: WO2019/038077
PCT Pub. Date: Feb. 28, 2019

(65) Prior Publication Data
US 2020/0198524 A1    Jun. 25, 2020

(30) Foreign Application Priority Data
Aug. 25, 2017  (DE) .................... 10 2017 119 520.3

(51) Int. Cl.
*F21S 41/657*    (2018.01)
*B60Q 1/08*    (2006.01)
(Continued)

(52) U.S. Cl.
CPC .............. *B60Q 1/08* (2013.01); *F21S 41/153* (2018.01); *F21S 41/657* (2018.01); *B60Q 2300/122* (2013.01)

(58) Field of Classification Search
CPC ........ B60Q 1/08; B60Q 1/346; B60Q 1/1423; B60Q 2300/12; B60Q 2300/054;
(Continued)

(56) References Cited

U.S. PATENT DOCUMENTS

| 5,660,454 A * | 8/1997 | Mori ...................... | B60Q 1/085 |
| | | | 362/466 |
| 5,949,346 A * | 9/1999 | Suzuki ................... | B60K 37/02 |
| | | | 340/815.45 |

(Continued)

FOREIGN PATENT DOCUMENTS

| DE | 102011006580 A1 | 10/2012 |
| DE | 102011079796 B4 | 8/2015 |

(Continued)

*Primary Examiner* — William J Carter
*Assistant Examiner* — Omar Rojas Cadima
(74) *Attorney, Agent, or Firm* — Husch Blackwell LLP

(57) ABSTRACT

A procedure is provided for actuating at least one light module of the light unit of a vehicle with a plurality of light sources and a light control system automatically actuating the light module. At least two first light distribution arrangements are generated and first data sets corresponding to the first light distribution arrangements are stored in a memory of the light control system. In order to implement a plurality of light distribution arrangements with less effort, at least one second light distribution arrangement is allocated to at least one pairing of two of the at least two first light distribution arrangements, and actuation of the light module for generating this at least one second light distribution
(Continued)

|  | LQ1 | LQ2 | ... | LQn |
|---|---|---|---|---|
| 0°-Ausrichtung : | 20 % | 70 % | | x % |
| 0,5°-Ausrichtung : | 30 % | 70 % | | x % |
| 1,0°-Ausrichtung : | 40 % | 70 % | | x % |
| 1,5°-Ausrichtung : | 40 % | 85 % | | x % |
| 2,0°-Ausrichtung : | 40% | 100 % | | x % | arrangement is performed depending on the first datasets of the assigned pairing from the first light distribution arrangements.

8 Claims, 2 Drawing Sheets

(51) Int. Cl.
*F21S 41/153* (2018.01)
*F21V 19/02* (2006.01)

(58) Field of Classification Search
CPC .... B60Q 2300/056; B60Q 1/12; B60Q 1/143; B60Q 2300/122; F21S 41/153; F21S 41/60; G06K 9/2027; B60R 25/24
See application file for complete search history.

(56) References Cited

U.S. PATENT DOCUMENTS

| | | | | |
|---|---|---|---|---|
| 2012/0299478 A1* | 11/2012 | Park | .................. | B60Q 1/143 |
| | | | | 315/82 |
| 2013/0148368 A1* | 6/2013 | Foltin | .................. | B60Q 1/08 |
| | | | | 362/466 |
| 2013/0343071 A1* | 12/2013 | Nagaoka | .............. | B60Q 9/008 |
| | | | | 362/466 |
| 2014/0163821 A1 | 6/2014 | Krau et al. | | |

FOREIGN PATENT DOCUMENTS

| | | |
|---|---|---|
| DE | 102015120204 A1 | 5/2017 |
| EP | 1316474 A2 | 6/2003 |
| EP | 2479064 A1 | 7/2012 |
| WO | 2017141395 A1 | 8/2017 |

* cited by examiner

|  | LQ1 | LQ2 | ... | LQn |
|---|---|---|---|---|
| 0°-Ausrichtung : | 20 % | 70 % |  | x % |
| 0,5°-Ausrichtung : | 30 % | 70 % |  | x % |
| 1,0°-Ausrichtung : | 40 % | 70 % |  | x % |
| 1,5°-Ausrichtung : | 40 % | 85 % |  | x % |
| 2,0°-Ausrichtung : | 40% | 100 % |  | x % |
| ... |  |  |  |  |

Fig. 2

PROCEDURE FOR ACTUATING AT LEAST ONE LIGHT MODULE OF A LIGHT UNIT, LIGHT UNIT, COMPUTER PROGRAM PRODUCT AND MACHINE-READABLE MEDIUM

CROSS REFERENCE

This application claims priority to PCT Application No. PCT/EP2018/071374 filed 7 Aug. 2018, which itself claims priority to German Application No. 10 2017 119520.3, filed 25 Aug. 2017, the entirety of both of which are hereby incorporated by reference.

FIELD OF THE INVENTION

The present invention relates to a procedure for controlling at least one light module of a light unit, a light unit for a vehicle, and a computer program product and a machine-readable medium.

BACKGROUND

Procedures for controlling at least one light module of a light unit of a vehicle, light units of a vehicle, computer program products and machine-readable media are already known from the previous art in numerous embodiments.

For example, light units for vehicles are known with at least one light module comprising a plurality of light sources and with a light control system for automatically actuating the light module, where at least two first light distribution arrangements can be created by means of the light control system and the light module in the vehicle environment of a vehicle that can be illuminated by the light module and first datasets corresponding to the first light distribution arrangements are stored in a memory of the light control system and where the light module for creation of the first light distribution arrangements can be actuated by means of the light control system depending on the first datasets. For example, the light unit can be a pair of a vehicle's main headlamps, where each main headlamp features a light module. First light distribution arrangements differing from each other can be implemented by the two main headlamps. In this context, one first light distribution could take the form of a vehicle's low beam or a high beam or, for instance, a special light distribution for driving along highways, in urban areas or the like.

Furthermore, a procedure for establishing PWM values for LED modules is known from DE 10 2011 079 796 B4, which is intended to make it possible to implement precise color mixing in the LED module despite temperature fluctuations.

This is where the present invention comes in.

SUMMARY OF THE INVENTION

The present invention is based on the task of implementing a plurality of light distribution arrangements with less effort.

This task is solved by a procedure for actuating at least one light module of a light unit of a vehicle with the features of claim 1, a light unit for a vehicle with the features of claim 7. The dependent claims relate to advantageous refinements of the invention.

One material advantage of the invention is specifically that a plurality of light distribution arrangements can be implemented with little effort. Using the invention makes it possible to generate several light distribution arrangements with less computing power, a simpler light control system and less memory capacity of the light control system. This is advantageous in particular with a plurality of light distribution arrangements. This also greatly simplifies later reconfiguration or modification of the light control system. The term 'light distribution' is to be interpreted in broad terms and can comprise a spatial expansion of a light beam and/or a spatial alignment of a light beam and/or an illuminance distribution of a light beam and/or a light color distribution of a light beam. This list is not exhaustive but only provides a few examples.

In principle, actuation of the light module for generation of the at least one second light distribution arrangement can be chosen at will within wide suitable limits depending on the first datasets of the pairing of first light distribution arrangements allocated to this second light distribution. As a matter of expediency, the actuation of the light module to create this second light distribution is performed depending on an interpolation between the first datasets of the allocated pairing of first light distribution arrangements.

The first datasets can also be chosen at will within wide suitable limits. Advantageously, the first datasets comprise light outputs of the plurality of light sources. The light outputs of the plurality of light sources and particularly important parameters for the overall optical impression of a light distribution.

For this reason, a particularly advantageous refinement of the procedure in accordance with the invention provides for a situation where the first datasets take the form of first light outputs of the plurality of light sources. In this way, the quantity of first datasets is reduced to the light outputs. A further reduction in the effort need to implement the procedure in accordance with the invention is correspondingly facilitated.

A further advantageous refinement of the procedure in accordance with the invention provides that the two light distribution arrangements of the pairing of first light distribution arrangements and the at least one of the second light distribution arrangements allocated to this pairing each take the form of one of differing alignments of a light beam generated by means of the light module to a longitudinal axis of the vehicle, where the at least one second light distribution takes the form of a light distribution arranged relative to the two first light distribution arrangements of this pairing of first light distribution arrangements. Otherwise datasets would have to be stored in the memory of the light control system for each individual light distribution when swiveling the light beam. The latter case would require a large memory and a great deal of effort for storing the data and adapting the same in the event of later modification as well as great deal of processing power on the part of the light control system.

In principle, actuation of the light module by means of the light control system can be chosen at will within wide suitable limits. One advantageous refinement of the aforementioned embodiment, however, provides for a situation where the light control system actuates the light module in such a way that one of the first two light distribution arrangements of the pairing of first light distribution arrangements are immediately chronologically followed by the at least one of the two light distributions allocated to this pairing and the other of the two first light distributions of this pairing of first light distributions follows chronologically afterwards. This makes it possible to swivel a light beam generated by the light control system and the light module, for example for bend lighting or the like, with little effort and to a great extent continually, i.e. without any leaps that can be optically perceived by the vehicle's driver.

The plurality of light sources can be chosen at will within wide suitable limits in terms of type, arrangement, dimensions, material and number. One especially beneficial refinement of the light unit in accordance with the invention, however, provides for the plurality of light sources of the light module to take the form of LEDs. LEDs are favorably priced and offer compact dimensions.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 2 illustrates a table with sample values of light output of individual light sources of the light unit shown in part.

DETAILED DESCRIPTION OF THE DRAWINGS

Figure 1:
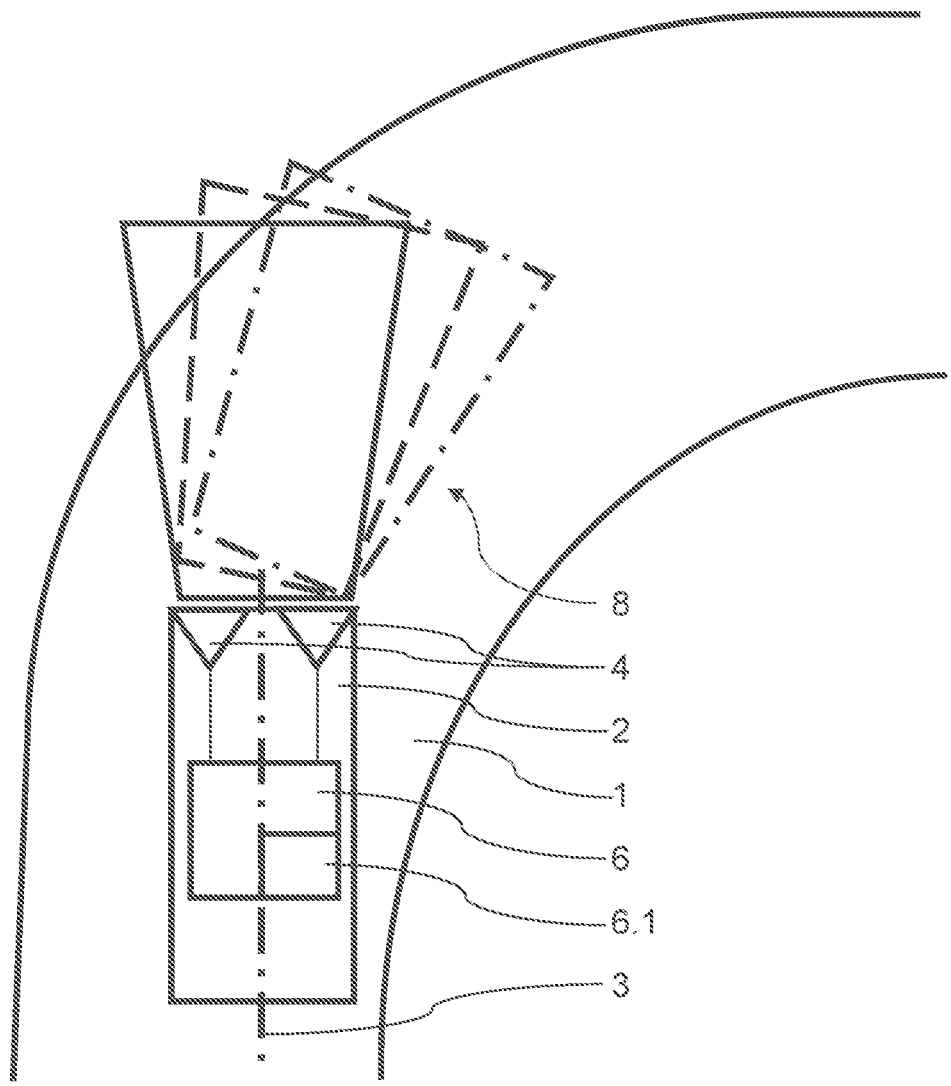
FIG. 1 illustrates a sample embodiment of a light unit in accordance with the invention, shown in part.

FIG. 1 shows a sample embodiment of a light unit in accordance with the invention for a vehicle 2 in the form of a motor vehicle shown with the vehicle's longitudinal axis, driving along a road 1. In FIG. 1, the vehicle is marked by the dash-dotted line 3. The light unit of the motor vehicle 2 features two main headlamps 4, each with one light module. Each of the two light modules comprises a plurality of light sources in the form of LEDs, where the LEDs of each light module are arranged in an LED matrix. The light modules and the LEDs are not shown. Each of the LEDs of the two light modules can be individually actuated and dimmed by means of a light control system 6. In this context, the LEDs are actuated depending on a recognition device for identifying a vehicle status, for example a steering angle of the vehicle 2. The recognition device is not shown. The recognition device can, however, take the alternative or additional form of a recognition device for identifying the vehicle environment, for example as a vehicle's front camera or in another way known to the specialist and of a suitable nature.

A plurality of first datasets are stored in a memory 6.1 of the light control system 6, where the first datasets take the form of light outputs of the plurality of LEDs of the two light modules for a plurality of first light distribution arrangements. The table of FIG. 2 shows part of the light outputs of the first light distribution arrangements of the LEDs of the two light modules. In the table of FIG. 2, the first line corresponds to a first light distribution and the third line to a further first light distribution, where the first light distribution is allocated in accordance with the first line to an alignment of 0°, in relation to the longitudinal axis of the vehicle 3, of a light beam 8 of the main headlamps 4. The first light distribution in accordance with the third line is allocated to an alignment of 1.0° in relation to the longitudinal axis of the vehicle 3 of the light beam 8 of the main headlamps 4 that can be generated with the two light modules.

If the light beam 8 were now to be transformed directly from its 0° alignment, i.e. from the one first light distribution, into its 1.0° alignment, i.e. in the further first light distribution, this would, for example, be optically perceivable by a driver of the motor vehicle 2. This is generally not desired. Correspondingly, at least one additional light distribution would now have to be saved in the memory 6.1 of the light control system 6 in order, for example, to generate an alignment of the light beam 8 between its 0° alignment and its 1.0° alignment.

In accordance with the sample embodiment, the procedure in accordance with the invention, however, provides for a situation where, by means of the first datasets correlating to the first light distribution in accordance with the first line in FIG. 2 and the first datasets correlating to the first light distribution in accordance with the third line in FIG. 2, i.e. from the pairing of these two datasets, depending on an interpolation between these first datasets, a second light distribution is allocated to this pairing by means of the light control system 6 and the actuation of the light module for generating this second light distribution is performed depending on these first datasets of this allocated pairing. In the table of FIG. 2, the second line corresponds to this second light distribution, where the second light distribution is allocated to an alignment of 0.5°, in relation to the vehicle's longitudinal axis 3, of the light beam 8 of the main headlamps 4. The second light distribution thus takes the form of a light distribution arranged relative to the vehicle's longitudinal axes 3 between the two aforementioned first light distribution arrangements.

Some the light outputs for each of the LEDs of the two light modules of the main headlamps 4 are quoted in the columns of FIG. 2. For instance, a light output of 20% of the maximum operating current of LED LQ1 is stated for LED LQ1 for the first light distribution in accordance with the first line and stored in the memory 6.1 of the light control system 6 for this first light distribution. The same applies for the other LEDs, i.e. for the LED LQ2, for example, an operating current of 70% of the maximum operating current of such LED LQ2.

A comparable set of data, i.e of light outputs, is also stored in the memory 6.1 of the light control system 6 for the first light distribution in accordance with the third line. For LED LQ1, for example, a light output of 40% of its maximum operating current has been determined and stored and for LED LQ2 a light output of 70%.

In contrast to the first light distribution arrangements in accordance with the first line and the third line, there are no datasets corresponding to the second light distribution in accordance with the second line, i.e. light outputs for the individual LEDs of each light module, stored in memory 6.1 of the light control system 6. If necessary, i.e. if the light beam 8 is to be swiveled from its 0° alignment into its 1.0° alignment or beyond, the light outputs for each LED of the two main headlamps 4 required for such alignment are interpolated in the light control system 6 in the manner known to a specialist depending on the first datasets of the first light distribution arrangements in accordance with the first line and the third line and the two light modules of the main headlamps 4 are actuated by the light control system 6 to generate this second light distribution arrangement depending on such interpolation. For example, 30% of the maximum operating current is calculated by the light control system for LED LQ1 and 70% for LED LQ2 and these values are used for actuating the light modules by means of the light control system 6. In addition to the linear interpolation used here, other suitable interpolation methods known to a specialist are also conceivable.

The values for the light output of the LEDs interpolated in the aforementioned manner are marked by means of a black background in contrast to the values corresponding to the first light distribution arrangements. As a result, the light beam 8 is swiveled from its 0° alignment, immediately chronologically afterwards into its 0.5° alignment and chronologically thereafter into its 1° alignment. This is marked in FIG. 1 by different positions of the light beam 8, according to which the light beam 8 is shown in its 0° alignment by solid lines and in its 0.5° alignment by dashed lines and in its 1.0° alignment in dash-dotted lines. In the present sample embodiment, the light beam 8 is swiveled parallel to the road 1, i.e. parallel to the image plane of FIG. 1.

As can be seen from FIG. 2, additional first light distribution arrangements can be stored in the memory 6.1 of the light control system 6, from which, in each case, at least one second light distribution of the light control system 6 can be interpolated along the lines of the above statements. For this, see for instance the third, fourth and fifth line in FIG. 2. It can be clearly seen that the values for the light outputs of the LEDs in the third line that were already used as datasets corresponding to the first light distribution in accordance with the third line in swiveling the light beam 8 from its 0° alignment into its 1.0° alignment are likewise used as the datasets corresponding to the first light distribution in accordance with the third line in swiveling the light beam 8 from its 1.0° alignment to its 2.0° alignment. The values for the light outputs of the LEDs in the fifth line are developed and stored as additional first datasets corresponding to a first light distribution in swiveling the light beam 8 from its 1.0° alignment to its 2.0° alignment.

If, for instance, the vehicle's driver turns the motor vehicle 2 into a bend, as shown as an example in FIG. 1, the two light modules and thus their LEDs are actuated in the manner described above. The recognition device could, for instance, take the form of a recognition device for recognizing the steering angle of the motor vehicle 2, i.e. of a steering-angle sensor. Other forms of recognition devices, in particular recognition devices for recognizing the vehicle environment, are also conceivable, however.

In line with the statements regarding the swiveling of the light beam 8 of the motor vehicle 2 from its 0° alignment to its 1.0° alignment, the light outputs for each LED of the two main headlamps 4 required for generating the second light distribution in accordance with the fourth line are interpolated as necessary, i.e. if the light beam 8 is to be swiveled from its 1.0° alignment into its 2.0 alignment or beyond, depending on the first datasets of the first light distribution arrangements in accordance with the third line and the fifth line in the light control system 6 and the two light modules of the main headlamps 4 are actuated by means of the light control system 6 to generate this second light distribution depending on such interpolation. This second light distribution corresponds to a 1.5° alignment of the light beam 8 in relation to the longitudinal axis 3 of the vehicle. As a result, the light beam 8 is swiveled from its 1.0° alignment, immediately chronologically afterwards into its 1.5° alignment and chronologically thereafter into its 2.0° alignment.

In accordance with the above statements, it is possible to perform any swiveling movement (within the technical limits of the light unit) of the light beam 8 generated by means of the light unit and emitted into the vehicle environment, i.e. from the 0° alignment of the light beam 8 in the direction of the 2° alignment of the light beam 8 and beyond, as well as in the opposite direction, i.e. from the 2° alignment of the light beam 8 in the direction of the 0° alignment and beyond. In every case, in relation to the longitudinal axis 3 of the motor vehicle 2.

It is, of course, also possible for the swiveling of the light beam 8 to be performed from the 0° alignment of the light beam 8 in the direction of the −2° deflection. Correspondingly, the light beam would be swiveled in the manner explained above from its 0° alignment immediately chronologically afterwards into its −0.5° deflection chronologically thereafter into its −1.0° deflection, chronologically afterwards into its 1.5° deflection and chronologically afterwards into its −2.0° deflection and beyond.

The invention is not limited to the present sample embodiment.

It is possible, for example, for other light functions, such as a low beam or high beam or special functions, such as town light, motorway light or the like, to also be generated by means of the invention in an advantageous manner. Furthermore, the swiveling of the light beam is not limited to swiveling of the light beam running parallel to the road. It would be conceivable for example that the light beam be swiveled vertically to the road or parallel or vertically to the road in the manner in accordance with the invention.

It is also possible for less than the complete light beam of the two main headlamps but only a focal point of the light, i.e. an area of higher illuminance in comparison to the rest of the vehicle environment illuminated by means of the main headlamps, to be swiveled in the manner explained.

In contrast to the sample embodiment, it is also conceivable that not merely a second light distribution but a plurality of second light distribution arrangements are interpolated between a pairing of two of the at least two first light distribution arrangements by means of first datasets corresponding to this pairing or are allocated in another manner known to a specialist and are used for actuating the light modules.

Furthermore, the first and the second datasets are not limited to light outputs of light sources. The first and the second datasets can also comprise suitable parameters of light distribution arrangements known to a specialist in addition to or as an alternative to light outputs from light sources.

The term 'light distribution' is to be interpreted in general terms so that other suitable light distribution arrangements known to the specialist, whether on their own or in combination, are included in addition to a spatial alignment of a light beam. These are, for example, a spatial expansion of a light beam and/or a illuminance distribution of a light beam and/or a light color distribution of a light beam.

LIST OF REFERENCE SYMBOLS

1 Road
2 Vehicle in the form of a motor vehicle
3 Vehicle's longitudinal axis 2
4 Main headlamps of the light unit
6 Light control system of the light unit
6.1 Memory of the light control system 6
8 Light beam

The invention claimed is:
1. A method for actuating at least one light module of a light unit of a vehicle, wherein the at least one light module includes a plurality of light sources and a light control system for the automatic actuation of the light module, the method comprising the steps of:
  storing in a memory first datasets corresponding to at least two first light distributions, the first datasets comprising a first line of data corresponding to a first alignment of the light module and a second line of data corresponding to a second alignment of the light module;
  actuating the light module for generating the first light distributions depending on the first datasets;
  generating, by the light control system, a third line of data corresponding to a third alignment of the light module, the third line of data being an interpolation between the first line of data and the second line of data of the first datasets; and actuating the light module for generating a second light distribution depending on the third line of data.

2. The method in accordance with claim 1 wherein the first datasets comprise first light outputs of the plurality of light sources.

3. The method in accordance with claim 2, wherein the first datasets take the form of the first light outputs of the plurality of light sources.

4. The method in accordance with claim 1, wherein the at least two first light distributions and the second light distribution each take the form of one of differing alignments of a light beam generated by means of the light module to a longitudinal axis of the vehicle, where the second light distribution takes the form of a light distribution arranged relative to the longitudinal axis of the vehicle between the at least two first light distributions.

5. The method in accordance with claim 4, wherein the light control system actuates the light module in such a way that one of the at least two first light distributions are immediately chronologically followed by the second light distribution and the other one of the at least two first light distributions follows chronologically afterwards.

6. A computer program stored in a computer-readable medium that, when executed, performs the steps of claim 1.

7. A light unit of a vehicle, the light unit comprising:
at least one light module including a plurality of light sources;
a light control system for automatic actuation of the light module comprising a memory with first datasets corresponding to a first light distribution stored thereon, the first datasets comprising a first line of data corresponding to a first alignment of the light module and a second line of data corresponding to a second alignment of the light module;
the light module is configured to generate the first light distribution depending on the first datasets;
the light control system is configured to generate a third line of data corresponding to a third alignment of the light module, the third line of data being an interpolation between the first line of data and the second line of data of the first datasets; and
the light module is further configured to generate the second light distribution depending on the third line of data.

8. The light unit in accordance with claim 7, wherein the plurality of light sources of the light module take the form of LEDs.

* * * * *